United States Patent
Marque-Pucheu (10) Patent No.: US 7,254,393 B2
(45) Date of Patent: Aug. 7, 2007

(54) INTERCELLULAR HANDOVER METHOD IN A RADIOCOMMUNICATION SYSTEM WITH MOBILE TERMINALS

(75) Inventor: Gérard Marque-Pucheu, Verneuil (FR)

(73) Assignee: EADS Secure Networks, Montigny Le Bratonneux (FR)

( * ) Notice: Subject to any disclaimer, the term of this patent is extended or adjusted under 35 U.S.C. 154(b) by 68 days.

(21) Appl. No.: 10/469,417

(22) PCT Filed: Mar. 1, 2002

(86) PCT No.: PCT/FR02/00757

§ 371 (c)(1),
(2), (4) Date: Sep. 16, 2003

(87) PCT Pub. No.: WO02/071784

PCT Pub. Date: Sep. 12, 2002

(65) Prior Publication Data

US 2004/0097231 A1    May 20, 2004

(30) Foreign Application Priority Data

Mar. 1, 2001   (FR) .................................. 01 02816

(51) Int. Cl.
H04Q 7/20 (2006.01)
H04B 7/208 (2006.01)
H04B 7/212 (2006.01)

(52) U.S. Cl. ............... 455/436; 455/432.1; 455/422.1; 455/442; 370/344; 370/321

(58) Field of Classification Search ............... 455/522, 455/69, 67.11, 67.13, 67.12, 453, 442, 88, 455/501, 517, 63, 436, 422.1, 435.1, 450, 455/452.2, 455; 370/208, 342, 338, 328, 370/485, 500, 344, 321, 347, 442, 337; 375/200, 375/206

See application file for complete search history.

(56) References Cited

U.S. PATENT DOCUMENTS 5,278,991 A    1/1994    Ramsdale et al. ......... 455/33.2
6,122,265 A    1/1994    Ramsdale et al. ......... 455/33.2

(Continued)

FOREIGN PATENT DOCUMENTS

EP    797 367 A2    9/1997

(Continued)

OTHER PUBLICATIONS

IRS of International Patent Application PCT/FR02/00757 issued on May 13, 2002.

(Continued)

*Primary Examiner*—Naghmeh Mehrpour
(74) *Attorney, Agent, or Firm*—McCracken & Frank LLP (57) ABSTRACT

In a system of radiocommunication with mobile terminals, the invention proposes to establish a vote configuration or a simulcast configuration for intercellular handover of a communication set up between a mobile terminal (60) and a base station (11) of a current cell (10), said configuration including the current cell (10) and adjacent cells (20, 30) which are eligible for said handover, so as to enable a soft intercellular handover when the terminal (60) moves towards the adjacent cells (20, 30). The invention provides the advantage of reducing the interference level in the neighbouring cells, hence of increasing the frequency re-use rate.

13 Claims, 5 Drawing Sheets

U.S. PATENT DOCUMENTS

| | | | |
|---|---|---|---|
| 5,319,795 A | 6/1994 | Hamabe et al. | 455/33.2 |
| 5,327,577 A | 7/1994 | Uddenfeldt | 455/33.2 |
| 5,884,187 A | 3/1999 | Ziv et al. | 455/522 |
| 6,073,021 A | 6/2000 | Kumar et al. | 455/442 |
| 2002/0067707 A1* | 6/2002 | Morales et al. | 370/331 |
| 2004/0032844 A1* | 2/2004 | Lewis et al. | 370/338 |
| 2004/0120277 A1* | 6/2004 | Holur et al. | 370/328 |

FOREIGN PATENT DOCUMENTS

| | | |
|---|---|---|
| EP | 0 881 852 | 2/1998 |
| EP | 876 005 A1 | 11/1998 |
| EP | 964 595 A3 | 12/1999 |
| EP | 1 047 276 | 10/2000 |
| GB | 2 338 376 A | 12/1999 |

OTHER PUBLICATIONS

International Preliminary Examination Report PCT/FR02/00757 dated Apr. 2, 2003.

* cited by examiner

INTERCELLULAR HANDOVER METHOD IN A RADIOCOMMUNICATION SYSTEM WITH MOBILE TERMINALS

BACKGROUND OF THE INVENTION

The present invention relates to an intercell handover method, a radiocommunication system with mobile terminals implementing the method and switching equipment intended to be used in such a system.

It relates to the field of digital radiocommunications with mobile terminals, and finds applications in particular in private radiocommunication systems for professional users.

Such systems are in general cellular systems, in the sense that they include a radio subsystem (forming part of the fixed network) having base stations distributed over the geographic area covered by the system, the area covered by a respective base station being called a cell. The available radio resources (radio frequencies) are distributed among the various base stations to provide communications with mobile stations. This means that the same radio resources can be reused in non-adjacent cells, without incurring problems of interference between calls, and therefore means that the spectral efficiency of the system can be increased.

When a mobile station on a call moves from a determined cell, referred to as "source cell", to a neighboring cell, referred to as "destination cell", the call must be handed over to a frequency allocated to said destination cell. This operation is well known in cellular radiocommunication systems and is commonly called intercell handover.

Intercell handover is commanded, either through the action of the mobile station, or through that of the fixed network, according to (a) a first indication on the quality of the radio link between the mobile station and the base station of the source cell, and (b) a second indication on the quality of the radio link between the mobile station and the base station of the destination cell. These indications are measured by the mobile station. If the intercell handover takes place through the action of the fixed network, these indications are furthermore transmitted to the fixed network via a special-purpose signaling channel. The fixed network commands the intercell handover when the second indication becomes better than the first.

To prevent the intercell handover taking place too early, which would run the risk of leading to its failure, with the consequence of the possible loss of the call, the provision of a hysteresis is also known, for the comparison between the first indication and the second indication.

Measurements, performed by the mobile station to evaluate the first and second indications, take place during polling time slots, during which the mobile station is neither receiving nor transmitting any signal related to the call in progress or to signaling. These measurements are based on the polling of the beacon frequency of the destination cell. The first and second indications are evaluated, by the fixed network, by taking a statistical mean over several such measurements.

In practice, since it is impossible to know in principle which neighboring cell of the source cell the mobile station is moving to, the mobile station polls the beacon frequencies of a plurality of neighboring cells, the references of which are transmitted to it by the fixed network via a special-purpose signaling channel. In fact, there is therefore a plurality of second indications on the quality of the radio link between the mobile station and the base station of each respective neighboring cell.

In certain systems, the measurements to evaluate the first and second indications (one second indication per neighboring cell considered) are performed with a relatively long period between two consecutive measurements due to the low recurrence of polling time slots. This is for example the case for FDMA systems, that is frequency division multiple access systems, or for low order TDMA systems, that is time division multiple access systems, for example of order 2 (TDMA-2). It follows that the decision to command an intercell handover is taken by the fixed network based on measurements for which the statistical value is relatively low. The result of this can be intercell handover decisions that are too early or too late. In the first case, the call risks being lost. In the second case, the mobile station risks becoming a source of interference for the calls set up on the same frequency in other cells of the network, and this is all the more so since a control mechanism causes the transmit power to increase when the mobile station moves away from the base station with which it is communicating.

The invention aims to overcome the abovementioned drawbacks of digital radiocommunication systems with mobile terminals.

To this end, the invention proposes the implementation of a technique called intercell soft handover. This technique has become known through its application in code division multiple access (CDMA) systems. The principle of this technique relies on an absence of breakage of the call during the transition from one cell to another. For CDMA systems, in which the same frequency can be used in two neighboring cells, one implementation of the principle consists in allocating in two neighboring cells the same code for a given call. This enables the mobile station to be received, for the entire cell change duration, both by the source cell and by the destination cell, and thus to pass softly from one to the other.

Examples of application of the intercell soft handover technique are given in references U.S. Pat. No. 6,073,021 and EP-A-0 797 367. The techniques written up in these documents apply however only to CDMA systems.

There are many advantages of this technique. First, it enables minimization of failures during intercell handovers since at no moment is there a sudden change in radio link and since, due to the availability during the critical phase of two radio links whose quality levels add together, the risks of a resulting poor quality radio link diminish considerably. Secondly, due to the fact that the intercell handover is not irreversible during its critical phase, the decision can be taken earlier, while the quality of the link with the source cell is still relatively satisfactory, thus avoiding the situation in which a mobile station moving away from a cell transmits at too high a power level due to its separation from the base station.

Adapting the principle to systems other than CDMA systems, and in particular to the GSM system, was proposed for example in document GB-A 2 338 376 (WO 99/65264). Since the normal intercell handover mechanism proposed by GSM (TDMA system of order 8) is an operation that is well suited to the normal cellular mode, this document proposes a solution for picocells provided in the densest urban areas. A set of picocells in fact forms a single cell in the sense of the cellular system considered (GSM in this case), this cell having a single BCCH control channel, transmitting in simulcast mode at a particular frequency. Since, according to the GSM standard, this frequency must be transmitted continuously, a certain number of traffic channels (in general seven since the BCCH channel occupies only one time slot per frame on a carrier in a TDMA-8 system such as GSM) also turn out to be transmitting in simulcast mode. From that moment, a mobile station communicating over a traffic channel dedicated to one of the picocells, and whose link quality falls below a certain threshold, undergoes a handover internal to the cell (called intracell handover), bringing it to one of the traffic channels in simulcast mode. The indications on the quality of links in the uplink direction on this channel, which is transmitted and received by the various base stations of the picocells, are used to quickly determine the picocell to which the handover must take place. A second handover internal to the cell is then performed to this picocell, completing the change of picocell.

This mechanism, based on a control channel whose coverage is much greater than the traffic channels to which it gives access, applies only to the case of systems operating in very dense environments and which, since they require a high frequency reuse rate, have a network of picocells superimposed on the network of cells.

However, these picocells are not cells in the usual sense of the term, since they do not have a specific control channel. This mechanism applies only to high ranking TDMA systems since a certain number of traffic channels at the same frequency as the single control channel of the configuration is required, which is impossible with an FDMA or low ranking (for example 2) TDMA system.

In addition, it assumes the existence of traffic channels in simulcast mode having the same coverage as the control channel, which naturally turns out to be the case in the GSM system but can turn out to be more difficult, even impossible, to achieve in other systems.

Document U.S. Pat. No. 5,278,991 proposes a similar technique in which an umbrella macrocell covers a certain number of microcells. This technique differs from the one described in the abovementioned document mainly by the fact that the microcells are authentic cells and each has a respective broadcast control channel (BCCH channel). Nevertheless, it also applies only to multilayer systems, comprising a contiguous macrocell layer covering a layer of microcells that are not necessarily contiguous.

Document EP-A-0 876 005 discloses an intercell handover technique according to which there exist frequencies common to all the cells, at one of which frequencies the mobile station transmits during the intercell handover procedure. However, the technique described requires that the mobile station changes frequency to transmit on this common frequency, prior to executing the intercell handover. In addition, this technique requires that common frequencies are assigned exclusively to the various base stations for executing the intercell handover procedure. In addition, this technique means that the base stations do not transmit at the frequency paired with the common frequency of reception by the base stations. Finally, it assumes that the list of cells involved in the intercell handover procedure is defined in advance.

SUMMARY OF THE INVENTION

As far as the present invention is concerned, it proposes an intercell handover method designed for the case of large-sized cells, for narrowband networks whether they be FDMA or low-order TDMA.

More specifically, the invention proposes a method of intercell handover of a call between a mobile station and a fixed network of a cellular radiocommunication system, in particular a private radiocommunication system for professional users, for handing over the call from the base station of a current cell to the base station of a neighboring cell, the method comprising the following steps:

a) determination, by the mobile station, of a first indication relative to the quality of the radio link between the mobile station and the base station of the current cell;

b) scan, by the mobile station, of the broadcast control channel of at least one neighboring cell and corresponding determination of a second indication relative to the quality of the radio link between the mobile station and the base station of said neighboring cell;

c) transmission to the fixed network, by the mobile station, of the first and second indications;

d) a first comparison, by the fixed network, of the first and second indications in order to deduce therefrom, where necessary, at least one neighboring cell that is eligible for the intercell handover;

e) allocation, by the fixed network, for the call in the eligible cell, of a traffic channel, at least in the uplink direction, set up at the same frequency and/or the same time slot as a traffic channel in the uplink direction which is allocated to the call in the current cell;

f) determination, by the fixed network, of a third indication relative to the quality of the radio link between the mobile station and the base station of the current cell;

g) determination, by the fixed network, of a fourth indication relative to the quality of the radio link between the mobile station and the base station of the eligible cell;

h) a second comparison, by the fixed network, of the third and fourth indications in order to deduce therefrom, where necessary, an order of intercell handover.

The method enables the call to be handed over from the base station of the current cell to the base station of the neighboring cell while maintaining the call, considerably reducing the risk of losing the call.

Advantageously, the cell or cells that are eligible for the intercell handover are selected dynamically by virtue of steps a) to d). The cells involved in the intercell handover procedure are therefore only those that are eligible, that is to say likely to be elected for the handover. In addition, as the mobile station continues to take measurements (steps a) and b)) and transmit to the fixed network (step c)) the result of these measurements during the whole intercell handover procedure, the list of cells involved can vary dynamically during this procedure.

In a first mode of implementation, the network establishes a voting configuration including the current cell and the eligible cells. In this case, the mobile station continues to transmit (and to receive) on the channel that was initially allocated for the call in the current cell.

In a second mode of implementation, the fixed network establishes a "simulcast" configuration. In this case, the mobile station performs handover to a specific channel, having a carrier frequency reserved for this purpose in all the cells of the system.

The invention also proposes a radiocommunication system with mobile terminals, in particular a private radiocommunication system for professional users, comprising at least one mobile station and a fixed network with a network subsystem comprising switching equipment and a radio subsystem having one base station per cell, wherein the mobile station and the switching equipment include means for implementing the method.

The invention also proposes switching equipment intended to be used in such a system.

BRIEF DESCRIPTION OF THE DRAWINGS

Other features and advantages of the present invention will become more apparent upon reading the following description which is purely illustrative and must be read with reference to the accompanying drawings, in which there is represented.

DESCRIPTION OF PREFERRED EMBODIMENTS

Figure 1:
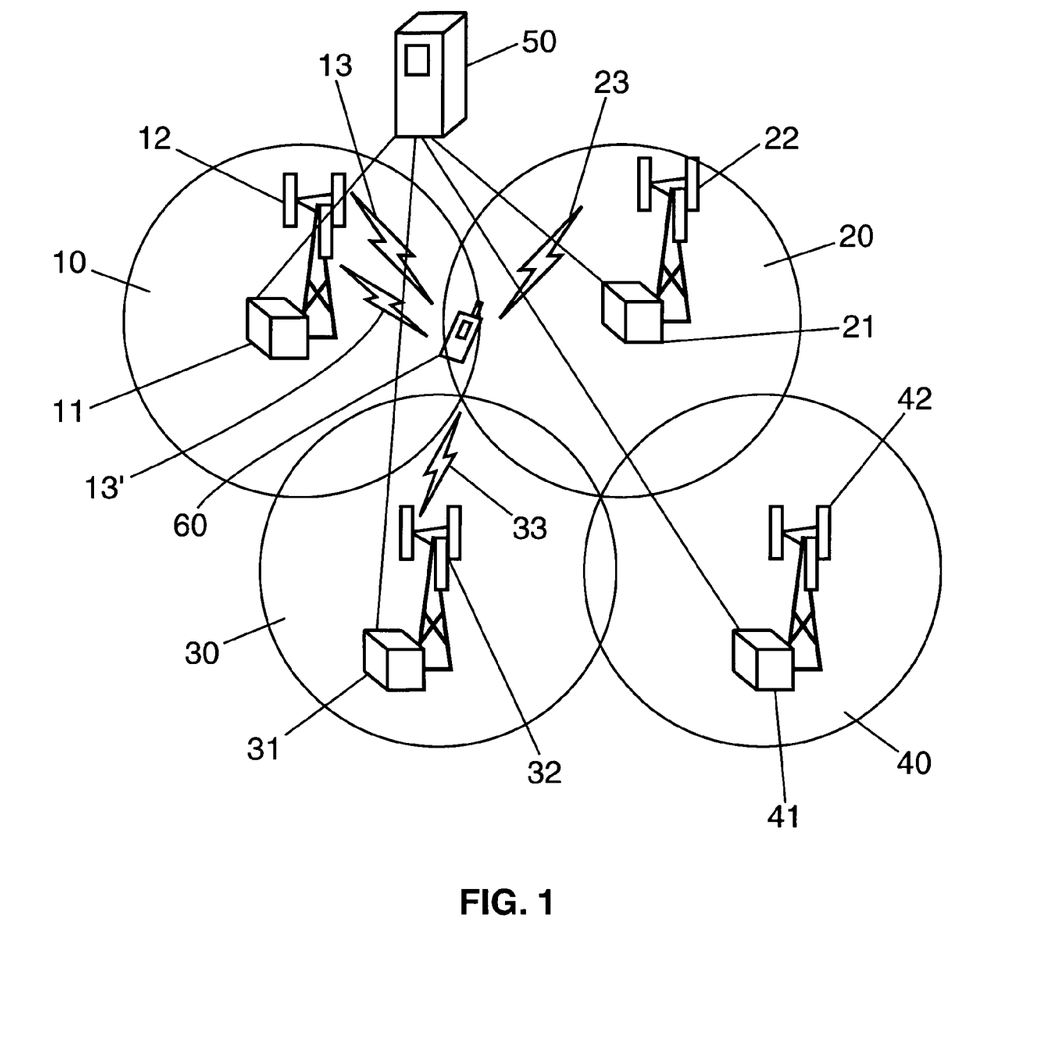
in FIG. 1: a schematic diagram of a digital radiocommunication system with mobile terminals according to the invention.

FIG. 1 schematically shows a radiocommunication system with mobile terminals (a mobile radio system) according to the invention. For example, it may be a private radiocommunication system for professional users, such as systems used by the police or by firefighters.

The system includes mobile stations such as mobile station 60, and a network of fixed equipment (fixed network). The fixed network includes a network subsystem with equipment such as databases which are used in particular for managing the locating of mobile stations, switches for setting up calls, servers for providing certain services to users, gateway servers to provide the interface with other networks, etc. In FIG. 1, only one switching equipment unit 50 of the network subsystem is represented.

The fixed network of the mobile radio system also includes a radio subsystem. This radio subsystem includes a group of base stations distributed over the geographic area covered by the system. Thus, in FIG. 1, four base stations 11, 21, 31 and 41 are represented, each coupled to an antenna device 12, 22, 32 and 42 respectively. The radio coverage area associated with each of these base stations forms a cell 10, 20, 30 and 40 respectively of the mobile radio system. These cells are adjacent and overlapping in pairs.

The mobile radio system is for example an FDMA system. Nevertheless, the advantages achieved by the invention are also appreciable in a low order TDMA system, for example of order 2 (TDMA-2 system).

Figure 2:
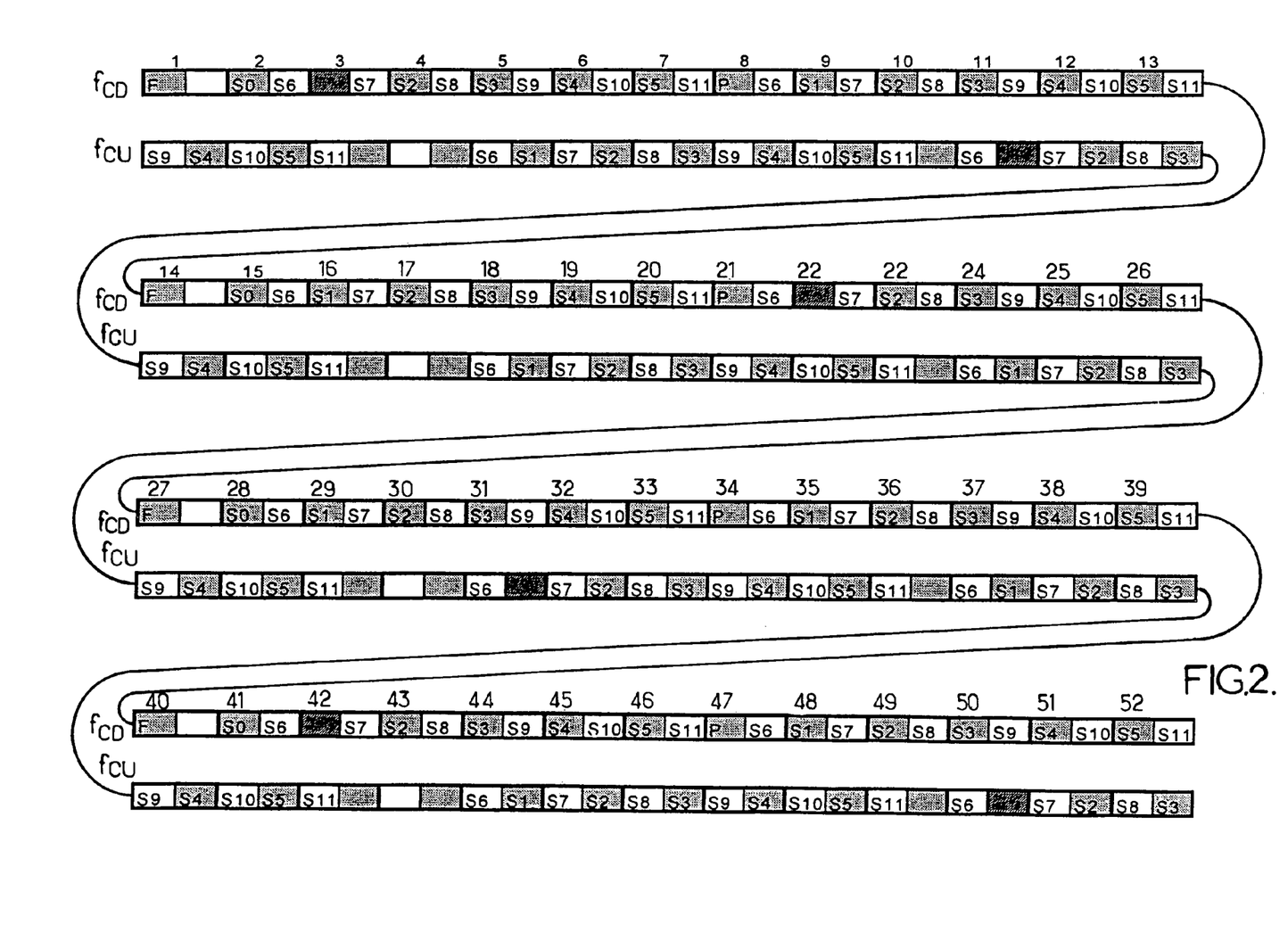
in FIG. 2: a diagram illustrating the frame structure of messages transmitted over a physical control channel of a system according to the invention.
Figure 3:
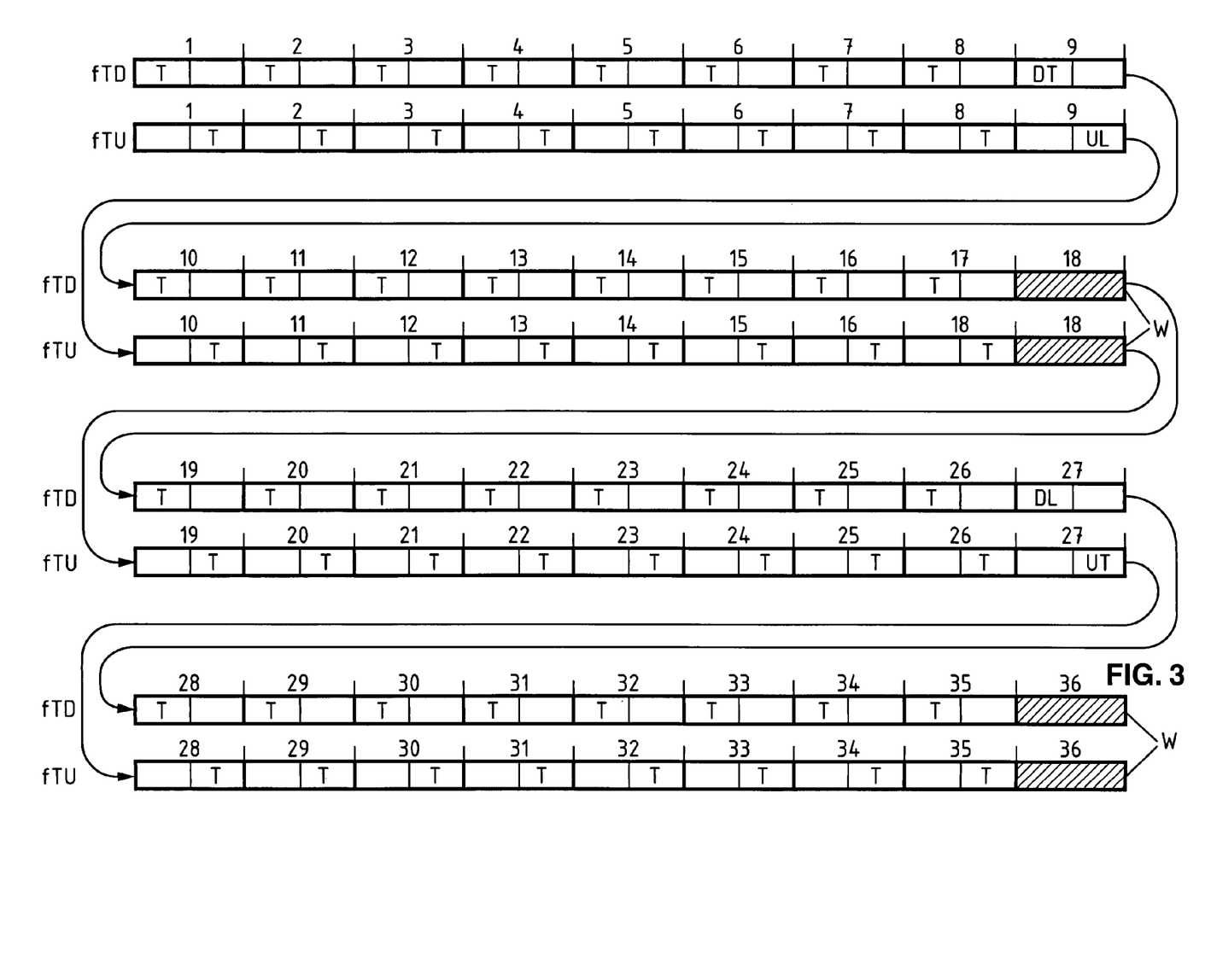
in FIG. 3: a diagram illustrating the frame structure of messages transmitted over physical traffic channels of a system according to the invention, in FIG. 4: a flowchart illustrating a sequence of steps of a method according to the invention.

FIGS. 2 and 3 are timing diagrams illustrating the frame structure of messages transmitted over physical control channels and over physical traffic channels, respectively, of a system according to the invention.

For each base station, there is defined, at a particular frequency, a downlink physical channel dedicated to the transmission of control information from the base station to the mobile stations, or downlink physical control channel. Symmetrically, an uplink physical channel, or uplink physical control channel, is defined at a particular frequency for the transmission of control information from mobile stations to the base station. These uplink or downlink physical control channels are divided into logical control channels by time division multiplexing. Some of these logical channels are common channels, shared by all the mobile stations located in the coverage area of the base station. Others are dedicated logical channels that the base station uses to communicate with particular mobile stations.

Represented in FIG. 2, by placing them one above the other, are the frame structure of a message transmitted over the uplink physical control channel established at a defined frequency $f_{CU}$, and the frame structure of a message transmitted over the downlink physical control channel established at a defined frequency $f_{CD}$. Each frame is divided into four segments which are represented one above the other in FIG. 2. Each segment has 26 individual time slots each having a duration d1, for example equal to 20 ms (milliseconds). Two consecutive individual time slots form a composite time slot having a duration d2 equal to twice the duration d1, that is 40 ms in the example. Each segment therefore comprises 13 composite time slots. In the figure, the numbers represented above the frame correspond to the composite time slot numbers.

In the example illustrated in FIG. 2, the individual time slots labeled F, S0 and P of the downlink physical control channel relate to common logical channels, while the individual time slots labeled Si (where $1 \leq i \leq 11$) of the downlink physical control channel and of the uplink physical control channel relate to dedicated logical channels which are bidirectional.

The slots F contain a synchronization pattern formed by a predetermined sequence of bits, for synchronizing mobile stations in frequency and in time. They are repeated four times per frame.

The time slots S0 contain system information needed for the coordination between the mobile stations and the base station. They are repeated four times per frame.

Finally, the time slots P form a logical broadcast channel PCH (Paging CHannel). They enable the base station to address messages to mobile stations with which the base station is not communicating (Paging), in particular wake-up messages. They are repeated four times per frame.

The time slots Si ($2 \leq i \leq 11$) of the dedicated logical control channels are used after an allocation procedure. They each occur eight times per frame, at the rate of two times per segment. Since the duration of a frame segment on the physical control channel is equal to 520 ms, a time slot Si, for a given i, occurs on average every 240 or 280 ms, with a duration of 100 ms between the transmission of a message by the base station in a time slot Si of the downlink control channel and the transmission of the response by the mobile station in the next time slot Si of the uplink control channel, and with a duration equal to 140 ms or 180 ms between the transmission of a message by the mobile station in a time slot Si of the uplink control channel and the transmission of the response by the base station in the next time slot Si of the downlink control channel.

The time slots S1 are also used after an allocation procedure. They occur five times per frame, at the rate of once in each of the first, second and fourth segments, and twice in the third segment. A time slot S1 occurs every 240, 280 or 520 ms.

The base station can additionally set up traffic channels with one or more mobile stations located in its radio coverage area after a call set up procedure performed by means of a dedicated control channel Si. The traffic channel set up with a mobile station is downlink and/or uplink. A traffic channel is multiplexed, at a defined frequency, with associated signaling channels used to exchange signaling information during communication.

The timing diagram of FIG. 3 illustrates the frame structure of messages exchanged over the physical traffic channels. In this figure are represented, by placing them one above the other, the frame structure of a message transmitted over an uplink physical traffic channel set up at a defined frequency $f_{TU}$, and the frame structure of a message transmitted over a downlink physical traffic channel set up at a defined frequency $f_{TD}$. A frame of the physical traffic channel is divided into four segments, which are represented one above the other in the figure. In other words, one segment corresponds to a quarter of a frame. Each segment is made up of nine composite time slots each having a duration d2 equal to 40 ms, each comprising two consecutive individual time slots, each of duration d1 equal to 20 ms. In the figure, the numbers indicated above the frame correspond to the composite time slot numbers.

Each of the first eight composite time slots of each segment of the frame has an odd individual time slot for the downlink direction and an even individual time slot for the uplink direction, labeled by the letter T. The recurrent succession of these time slots T forms a logical traffic channel, downlink and uplink respectively. Consequently, on the same downlink physical traffic channel set up at the defined frequency $f_{TD}$, the base station can multiplex, in the even individual time slots, another logical traffic channel set up with another mobile station.

The ninth composite time slot of the first segment and that of the third segment are reserved for the transmission of signaling information.

In particular, on the downlink physical traffic channel, the ninth composite time slot of the first segment has an odd individual time slot labeled DT (Downlink Talker), and that of the third segment has an odd individual time slot labeled DL (Downlink Listener). Likewise, on the uplink physical traffic channel, the ninth composite time slot of the first segment has an even individual time slot labeled UL (Uplink Listener), and that of the third segment has an even individual time slot labeled UT (Uplink Talker). The recurrent succession of these time slots forms the respective associated logical signaling channels.

The associated logical signaling channel DT is used by the base station, when it is listening to that which a mobile station is transmitting at frequency $f_{TU}$, to transmit the downlink signaling information. This downlink signaling can in particular relate to the checking of the radio transmit power level from the mobile station, according to power-level measurements performed by the base station. This check is used by the mobile station when it is transmitting to adjust its transmit power level so as to limit interference in the network.

The associated logical signaling channel DL is used by the base station, when it is transmitting to a mobile station at frequency $f_{TD}$, to transmit downlink signaling information. This can relate, in particular, to the identification of neighboring cells, in order to prepare intercell handovers.

The associated logical signaling channel UL is used by the mobile station, when it is listening to that which the base station is transmitting at frequency $f_{TD}$, to transmit uplink signaling information. This signaling can in particular relate to measurements of received power at the beacon frequency of neighboring cells, in order to prepare the intercell handovers.

Finally, the logical signaling channel UT is used by the mobile station, when it is transmitting to the base station at frequency $f_{TU}$, to transmit uplink signaling information. This uplink signaling can also relate to the transmission of measurements of received power at the beacon frequency of neighboring cells with a view to intercell handovers.

Of course, the various signaling elements exchanged over the channels DT, DL, UL and UT are not limited to those mentioned above.

The ninth composite time slot of the second and fourth segments of the frame is unoccupied. These unoccupied time slots, which are hatched in FIG. 3, form polling windows W during which the mobile station can change frequency in order to measure the received power at the frequency of the broadcast control channel (BCCH channel) of a neighboring cell.

Figure 4:
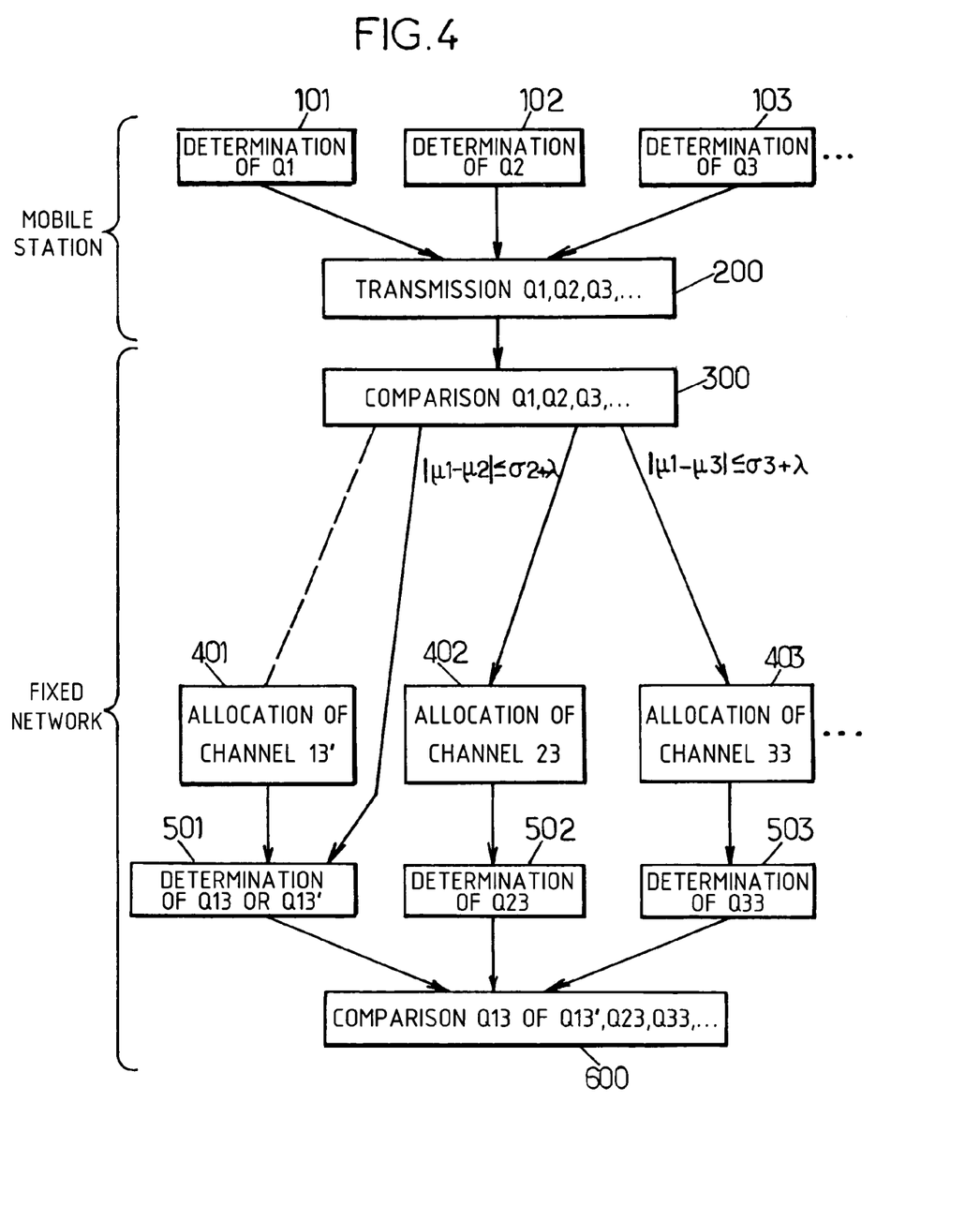

FIG. 4 is a flowchart of the steps of a method according to the invention, in which flowchart a distinction is drawn between the steps executed by the mobile station, in the upper part, and those executed by the fixed network, in the lower part.

Initially, a defined traffic channel 13 (FIG. 1) is allocated, in the uplink direction and in the downlink direction, to the call in a current cell. For example, it could be cell 10 covered by the base station 11.

In a step 101, the mobile terminal determines an indication Q1 relating to the quality of the radio link between the mobile station 60 and the base station 11 of the current cell 10. More specifically, it determines a series of values $Q1_i$ over at least some of the time slots during which it receives a signal from the base station 11, a mean value of which forms the indication Q1. This may involve time slots of the physical traffic channel that bears the channel 13 when the mobile station is receiving, and/or time slots of the physical control channel in all the cases. Since there are a substantial number of these time slots, there are a relatively large number of values $Q1_i$ and their mean therefore represents a relatively good statistical value.

In a step 102, the mobile station scans or polls the broadcast control channel (BCCH channel) of the neighboring cell 20 and measures an indication Q2 relating to the quality of the radio link between the mobile station and the base station 21 of this neighboring cell 20. This scanning or polling takes place during the polling windows W of the physical traffic channel that bears the channel 13, as shown in FIG. 3. More specifically, the mobile station produces a series of values $Q2_i$, for example one value per polling window, the mean of which forms the indication Q2. In general, the mobile station successively polls, in respective windows W, the broadcast control channel of each of the neighboring cells. It thus determines an indication relating to the quality of the radio link between the mobile station and the respective base station of each of these other neighboring cells. Thus, for example, in a step 103, it polls the BCCH channel of cell 30, and determines an indication Q3 relating to the quality of the radio link with the base station 31 of cell 30. The references of the neighboring cells concerned are transmitted to it by the fixed network, and in particular the base station 11, via one of the associated signaling channels DT or DL, depending on whether it is transmitting or receiving respectively.

The indications relative to the quality of a defined radio link are for example made up of a Frame Error Rate (FER). Naturally, other indications are possible, for example a Bit Error Rate (BER), or simply a received power level.

The indications Q2, Q3, etc., like the indication Q1, are determined based on a mean taken over a certain number of measurements $Q1_i$, $Q2_i$, $Q3_i$, etc. respectively. However, given the low recurrence of polling windows W, and given the number of neighboring cells whose respective BCCH channels must be polled, each during a defined polling window W, the measurements $Q2_i$, $Q3_i$, etc. are relatively limited in number. Consequently, their mean exhibits a low statistical value. In other words, the indications Q2, Q3, etc. are affected by an uncertainty which comes from the low number of measurements $Q2_i$, $Q3_i$, etc. respectively that are performed and considered in the calculation of the mean. In addition, this uncertainty depends on the speed of movement of the mobile station 60. In practice, it is observed that, at walking pace, the value of an indication thus obtained can deviate by about 10 decibels from the real mean value. It is for this reason that, according to the invention, these indications Q2, Q3, etc. are not directly considered for commanding an intercell handover.

In a step 200, the mobile station 60 transmits the indications Q1, Q2, Q3, etc. to the fixed network. In a preferred implementation, these are more particularly the measurements $Q1_i$, $Q2_i$, $Q3_i$, etc. that are transmitted, a mean of which is then calculated at the fixed network level. Nevertheless, this calculation may also be carried out at mobile station level, a mean value and a standard deviation associated with each of the indications Q1, Q2, Q3, etc. then being transmitted during this step 200. These transmissions take place via the associated signaling channels UL or UT, depending on whether the mobile station is receiving or transmitting respectively.

In a step 300, the fixed network compares the indications Q1, Q2, Q3, etc. However, as will be explained below, the decision to command a possible intercell handover is not taken by the fixed network directly based on the result of this comparison.

As was explained earlier, the indications Q1, Q2, Q3, etc. are statistical value indications, the result of calculating a mean over a certain number of measurements. Before specifying the detail of the comparison carried out in step 300, it is necessary to describe a calculation method for this mean, which is given by way of example only. In making the assumption that the series of values $Q1_i$ is the outcome of a random process obeying a normal density function, the indication Q1 may be determined by a mean $\mu 1$ and a standard deviation $\sigma 1$. In making the same assumptions for the series of measurements $Q1_i$ and $Q3_i$, the indications Q2 and Q3 can be determined by a mean $\mu 2$ and $\mu 3$ respectively, and by a standard deviation $\sigma 2$ and $\sigma 3$ respectively.

The comparison step 300 consists in determining whether one or more adjacent cells are eligible for an intercell handover. Regarding adjacent cell 20, step 3 thus has the following effects:

if the mean $\mu 2$ of the indication Q2 is better than the mean $\mu 1$ of the indication Q1, and if the difference between these two means is greater than the standard deviation $\sigma 2$ of the indication Q2 increased by a hysteresis value $\lambda$, then the fixed network decides that the radio link between the mobile station 60 and the base station 21 of the adjacent cell 20 is better than the radio link between the mobile station 60 and the base station 11 of the current cell 10. Under these conditions, the fixed network can command an intercell handover in favor of the adjacent cell 20. This command is then transmitted by the base station 11 and the intercell handover is carried out in a completely conventional manner with a low risk of failure;

if on the other hand the mean $\mu 1$ of the indication Q1 is better than the mean $\mu 2$ of the indication Q2, and if the difference between the means $\mu 1$ and $\mu 2$ is greater than the standard deviation $\sigma 2$ of the indication Q2 increased by the hysteresis value $\lambda$, then, the fixed network decides that the radio link between the mobile station 60 and the base station 11 of the current cell 10 is still better than the radio link between the mobile station 60 and the base station 21 of the adjacent cell 20. Consequently, the fixed network deduces therefrom that no intercell handover in favor of the adjacent cell 20 should take place;

in the intermediate case, that is to say when the difference between the mean values $\mu 1$ and $\mu 2$ is less than or equal to the standard deviation $\sigma 2$ increased by the hysteresis value $\lambda$ (that is when $|\mu 1-\mu 2| \leq \sigma 2+\lambda$), then the fixed network does not take any decision. In this case, in a step 402, the fixed network allocates a traffic channel 23 for the call in the adjacent cell 20. When the above relation is satisfied, the adjacent cell 20 is said to be eligible for an intercell handover.

The comparison step 300 also has similar effects as regards the indication Q3 for the adjacent cell 30, and may, where necessary (that is if the cell 30 is eligible), lead, during a step 403, to the allocation of a traffic channel 33 for the call in the adjacent cell 30. In a general way, the comparison step 300 has such effects for all the other adjacent cells. Where necessary, that is if the adjacent cell in question is eligible in the sense indicated earlier, the fixed network allocates a traffic channel for the call in said cell.

In a first implementation of the invention, the traffic channels such as 23 and 33 are allocated in the uplink direction only. Furthermore, they are allocated at the same frequency as the traffic channel 13 for the call between the mobile station 60 and the base station 11 of the current cell 10 (for an FDMA system) and/or in the same time slot (for a TDMA system). Thus, a particular configuration of the frequency plan is obtained, which corresponds to that encountered for the implementation of a voting mechanism in private radiocommunication systems for professional users. For this reason, this configuration is referred to as a "voting" configuration from now on.

In a step 501, the fixed network then determines an indication Q13 relating to the quality of the radio link between the mobile station 60 and the base station 11 of the current cell 10. Likewise, in steps 502 and/or 503, it determines indications Q23 and/or Q33 respectively relating to the quality of the radio link between the mobile station 60, and, respectively, the base station 21 of the eligible cell 20 and/or the base station 31 of the eligible cell 30. More specifically, the indications Q13, Q23, Q33, etc. are obtained by taking the mean of the measurements $Q13_i$, $Q23_i$, $Q33_i$, etc. respectively. Such measurements can be relatively high in number such that the statistical value of the indications Q13, Q23, Q33, etc. is good.

The indications Q13, Q23, Q33, etc. can be an SER, a BER and/or a received power level.

In a comparison step 600, the fixed network then compares the indication Q13 with the indication relating to the quality of the radio link between the mobile station 60 and the base station of each of the eligible cells, that is, in the example, the indications Q13 and Q23, and the indications Q13 and Q33, so as to deduce therefrom, where necessary, an order of intercell handover.

As previously, the assumption is made that the measurements $Q13_i$ are the realization of a random variable whose density function is normal, such that the indication Q13 is determined by a mean $\mu 13$ and a standard deviation $\sigma 13$. The same assumptions lead to the consideration that the indication Q23 is determined by a mean $\mu 23$ and a standard deviation σ23, and that the indication Q33 is determined by a considered adjacent mean μ33 and a standard deviation σ33.

Given these assumptions, the comparison step 600 may lead to the fixed network commanding an intercell handover in favor of the adjacent cell 20 if the mean μ23 is better than the mean μ13, and if the difference between these two means is greater than a hysteresis value λ. In effect, this means that the radio link between the mobile station 60 and the base station 21 of the adjacent cell 20 is better than that between the mobile station 60 and the base station 11 of the current cell 10. The traffic channel 13 can then be deallocated.

If on the other hand the mean value μ1 is better than the mean value μ2, and if the difference between these two mean values is greater than the hysteresis value λ, then the traffic channel 23 allocated to the call in the adjacent cell 20 can be deallocated. In effect, this means that the radio link with the base station 11 is still better than the radio link with the base station 21, such that no intercell handover in favor of the adjacent cell 20 should be commanded.

In the intermediate case nothing happens, so that the voting mechanism configuration remains unchanged.

Since the above comparisons are also carried out for other eligible cells such as cell 30 for example, it may happen that the first of the above conditions is fulfilled for several eligible cells simultaneously. In this case, the intercell handover is commanded by the fixed network in favor of that eligible cell for which the mean value of the indication relating to the quality of the radio link with the mobile station 60 is the best.

In a second implementation, the traffic channels such as 23 and 33 are allocated by the fixed network, at steps 402 and 403 respectively, in the uplink direction and in the downlink direction, at a particular frequency reserved for this purpose in each cell of the network. In this implementation, the fixed network also allocates, in a step 401, a specific traffic channel 13' (FIG. 1) to the call in the current cell 10. The specific traffic channel 13' is allocated, in the uplink direction and in the downlink direction, at the same frequency (for an FDMA system) and/or in the same time slot (for a TDMA system) as the traffic channels 23 and 33.

The traffic channels 13, 23, 33, etc. are therefore set up on a common physical channel (radio resource) specifically reserved in each cell for the implementation of intercell handovers.

The call in the current cell 10 is handed over to the specific traffic channel 13'. A particular configuration of the frequency plan is thus obtained, referred to as "simulcast" configuration, including the current cell and the eligible cells 20 and 30.

The traffic channel 13 originally allocated for the call in the current cell can then be deallocated.

The other steps of the method are identical to that which has been described below, replacing, in the corresponding description, and in FIG. 4, the references 13 and Q13 with the references 13' and Q13' respectively.

The first implementation above is well suited for an implementation of the method in a relatively dense geographic area, for example in an urban environment, in which the cells are of relatively small size (a few hundreds of square meters). This is because this first implementation does not require the reservation of specific radio resources in each cell. Furthermore, it enables the difference in quality of the radio link between the uplink direction and the downlink direction to be compensated for, due to the fact that the transmit power of the mobile stations, which in this context are generally portable terminals, is lower than the transmit power levels of the base stations. This compensation arises from the fact that the signals received simultaneously by the respective base stations of each of the cells of the voting configuration, for the call considered, contribute to obtaining a better quality link in the uplink direction. Thus, for example, if the voting configuration includes two eligible cells, and if each of the traffic channels in the uplink direction assigned to the call in these cells each exhibit a frame error rate equal to 10%, then the frame error rate of the uplink in the voting configuration is equal to 10%×10%, that is to say equal to 1%.

The second implementation presented above is, for its part, particularly well suited to the implementation of the method in geographic areas in which the traffic density is much lower and where, consequently, the cells are of relatively larger size (a few square kilometers). The mobile stations encountered in such areas are most often mobile terminals carried in motor vehicles, and the transmit power of these terminals is higher than that of portable terminals, such that the link budget is better balanced between the uplink direction and the downlink direction. This implementation has the additional advantage, compared to the first implementation, of strengthening the power level of the radio signal received by the mobile station for the entire intermediate phase of the intercell handover. This reduces the risk of a loss of the link in the downlink direction during this phase. However, it has the drawback of needing the reservation in each cell of radio resources specifically dedicated to its operation.

Advantageously, in the first as in the second implementation, the commands for checking the transmit power of the mobile terminal, which are sent by the fixed network via the associated signaling channels DT or DL, take account of the radio signals that are simultaneously received by the respective base stations of each of the cells belonging to the voting configuration or to the simulcast configuration respectively. Thus, the transmit power of the mobile station is lower, during the intercell handover phase of the method according to the invention, than with the intercell handover methods according to the prior art. Thus, the risks of interference in the other cells of the network in which the same frequency is reused are limited. This therefore enables the frequency reuse ratio to be increased and therefore the overall network traffic capacity to be increased. The method according to the invention can therefore be used to benefit from the positive effect of the hysteresis, which limits the number of intercell handovers, without having to bear its negative effect, that is transmission with a relatively high power by a mobile station located at the limit of cells, due to the delay in making the decision for the intercell handover.

Figure 5:
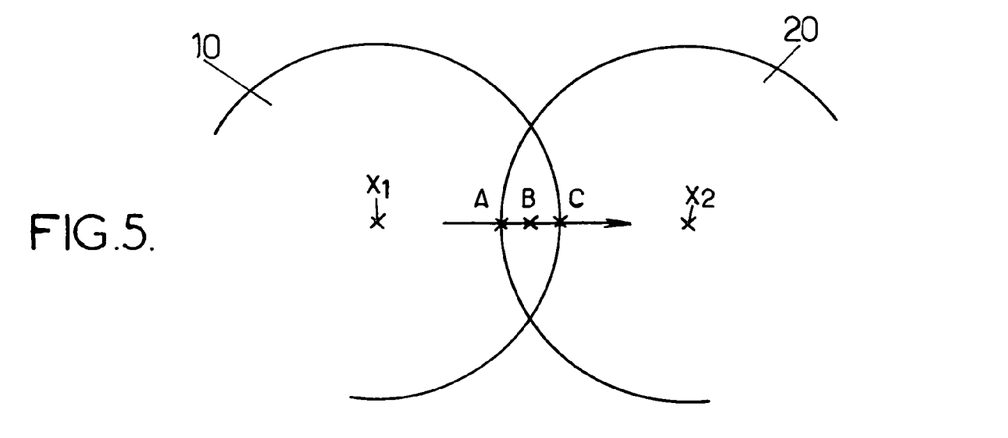
in FIG. 5: a schematic diagram showing the various positions of a mobile station during an intercell handover.

FIG. 5 represents various positions A, B and C of a mobile station moving from the current cell 10 to the adjacent cell 20. The references X1 and X2 denote the positions of the base stations 11 and 21 respectively of cells 10 and 20 respectively. Point A corresponds to the limit of destination cell 20. Point C corresponds to the limit of source cell 10, and point B corresponds approximately to the middle of the area of overlap between cells 10 and 20.

Figure 6:
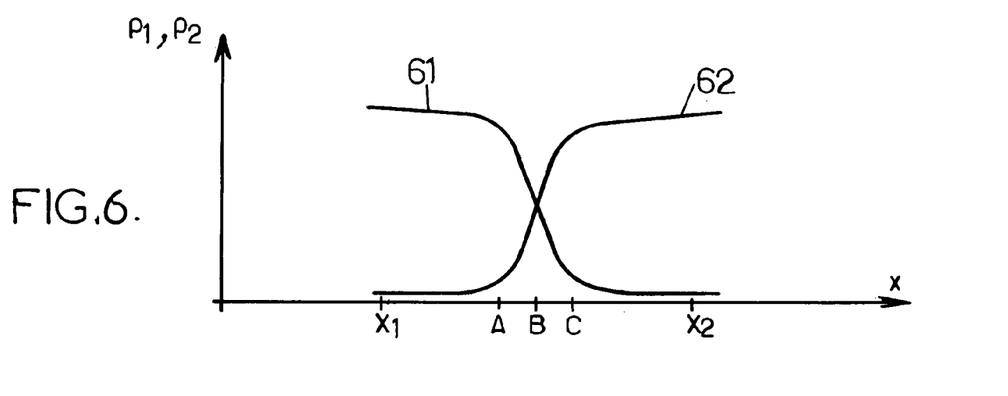
in FIG. 6: a graph showing how the radio power level received from a mobile station by the base stations of two respective neighboring cells changes during an intercell transfer; and, in FIG. 7: a graph illustrating the comparison of the change in radio power level emitted by a mobile station during an intercell handover in a system according to the prior art or according to the invention.

In the graph of FIG. 6, the curves 61 and 62 describe the change, as a function of the position x of the mobile station 60 on its trajectory, in the radio power P1 and P2 respectively of the mobile station 60 as it is received by the base stations 11 and 21 respectively.

As can be seen in this figure, the power level P1 decreases, with respect to its value at the center X1 of cell 10, as the mobile station 60 moves away from there. From position A, the power level P2 starts to become perceptible by the base station 21 of the destination cell 20. From position B, the power level P2 becomes greater than the power level P1. From position C, the power level P1 becomes too low to be detected by the base station 11 of the source cell 10.

To make the link with the description of the method according to the invention described earlier, it can be considered, schematically, that the voting configuration or the simulcast configuration are generated by the fixed network for the positions of the mobile station between position A and position C. It is during the time period in which the mobile station 60 is between these positions A and C that the intercell handover takes place, substantially when the mobile station 60 is in position B. During this entire period of time, corresponding to the intermediate phase of the intercell handover method according to the invention, use of the voting configuration or the simulcast configuration prevents the loss of the call. Thus, the intercell soft handover is achieved, as sought.

Figure 7:
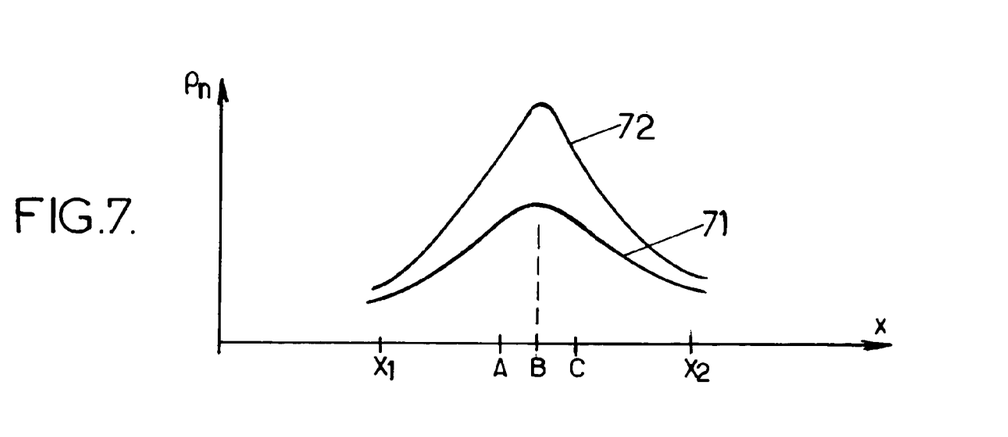

In addition, since the switching equipment 50 produces a command for checking the transmit power of the mobile terminal which takes into account the radio signals received by all the base stations participating in the voting configuration or in the simulcast configuration, the transmit power level PE of the mobile terminal 60 is much lower, during the intercell handover phase, than it would be without implementation of the method according to the invention. The graph of FIG. 7 schematically illustrates this advantage of the method. In this figure, the curves 71 and 72 represent the change in the power level PE as a function of the position x of the mobile station on its trajectory, in a system according to the invention and in a system according to the prior art respectively. As can be seen, the curve 71 is beneath the curve 72 between positions A and C, which expresses the fact that the power level PE is less during the intercell handover phase of the method according to the invention than the power level PE which would be reached otherwise.

The invention additionally proposes a radiocommunication system with mobile terminals, in particular a private radiocommunication system for professional users, including means for implementing the method described above. These means are implemented in the form of software executed in the mobile stations and in equipment of the fixed network of the system, such as the equipment 50 of the network subsystem which is represented in the block diagram of FIG. 1. The implementation of this software is within the capacity of those skilled in the art and does not call for particular comment in the present description. It may furthermore be noted that the software executed in the mobile stations for implementing steps 101, 102, 103, etc. and step 200 is identical to that executed in the mobile stations of known systems, since these steps are already implemented in such mobile stations.

The invention claimed is:

1. A method of intercell handover of a call between a mobile station and a fixed network of an FDMA and/or TDMA cellular radiocommunication system, for handing over the call from the base station of a current cell to the base station of a neighboring cell, the method comprising the following steps:
   a) determination, by the mobile station, of a first indication relative to the quality of the radio link between the mobile station and the base station of the current cell;
   b) scan, by the mobile station of the broadcast control channel of at least one neighboring cell and corresponding determination of a second indication relative to the quality of the radio link between the mobile station and the base station of said neighboring cell;
   c) transmission to the fixed network, by the mobile station, of the first and second indications;
   d) a first comparison, by the fixed network, of the first and second indications in order to deduce therefrom, where necessary, at least one neighboring cell that is eligible for the intercell handover;
   e) allocation, by the fixed network, for the call in the eligible cell, of a traffic channel, at least in the uplink direction, set up at the same frequency and/or the same time slot as a traffic channel in the uplink direction which is allocated to the call in the current cell;
   f) determination, by the fixed network, of a third indication relative to the quality of the radio link between the mobile station and the base station of the current cell;
   g) determination, by the fixed network, of a fourth indication relative to the quality of the radio link between the mobile station and the base station of the eligible cell;
   h) a second comparison, by the fixed network, of the third and fourth indications in order to deduce therefrom, where necessary, an order of intercell handover.

2. The method as claimed in claim 1, in which, a determined traffic channel being initially allocated for the call in the current cell, the traffic channel which at step e) is allocated for the call in the eligible cell is allocated in the uplink direction only at the same frequency and/or in the same time slot as said determined traffic channel in the uplink direction that is allocated to the call in the current cell.

3. The method as claimed in claim 1, in which method the traffic channel which, at step e), is allocated to the call in the eligible cell, is allocated both in the uplink direction and in the downlink direction, in which method, at step e), in addition, a specific traffic channel is allocated to the call in the current cell both in the uplink direction and in the downlink direction, at the same frequency and/or the same time slot as the corresponding channel allocated to the call in the eligible cell, and in which method the call in the current cell is handed over to this specific traffic channel.

4. The method as claimed in claim 1, in which, after step e), the fixed network transmits to the mobile station a command for controlling its transmit power according to the signal received by the base station of the current cell and by the base station of the eligible cell.

5. An FDMA and/or TDMA cellular radiocommunication system, comprising at least one mobile station and a fixed network with a network subsystem comprising switching equipment and a radio subsystem having one base station per cell, in which system the mobile station includes:
   means for determining a first indication relative to the quality of the radio link between the mobile station and the base station of a current cell;
   means for polling a broadcast control channel of at least one neighboring cell and for determining a second indication relative to the quality of the radio link between the mobile station and the base station of said neighboring cell;
   means for transmitting the first and second indications to the fixed network; and in which system the switching equipment includes:
   first comparison means for comparing the first and second indications in order to deduce therefrom, where necessary, at least one neighboring cell that is eligible for the intercell handover;

means for allocating, for the call in the eligible cell, a traffic channel, at least in the uplink direction, set up at the same frequency and/or the same time slot as a traffic channel in the uplink direction that is allocated to the call in the current cell;

means for determining a third indication relative to the quality of the radio link between the mobile station and the base station of the current cell;

means for determining a fourth indication relative to the quality of the radio link between the mobile station and the base station of the eligible cell;

second comparison means for comparing the third and fourth indications in order to deduce therefrom, where necessary, an order of intercell handover for handing over the call from the base station of the current cell to the base station of the eligible cell.

6. The system as claimed in claim 5, in which said means for allocating, of the switching equipment, are designed to allocate said traffic channel in the uplink direction only, at the same frequency and/or in the same time slot as said traffic channel in the uplink direction that is allocated to the call in the current cell.

7. The system as claimed in claim 5, in which said means for allocating, of the switching equipment, are designed to allocate a specific traffic channel to the call in the current cell both in the uplink direction and in the downlink direction, at the same frequency and/or the same time slot as the corresponding channel allocated to the call in the eligible cell, and in which the switching equipment additionally includes means for handing over the call in the current cell to this specific traffic channel.

8. The system as claimed in claim 5, in which the switching equipment includes means for producing a command for controlling the transmit power of the mobile station by considering the signal received by the base station of the current cell and that received by the base station of the eligible cell.

9. Switching equipment intended to be used in a system as claimed in claim 5, including:
first comparison means for comparing the first and second indications in order to deduce therefrom, where necessary, at least one neighboring cell that is eligible for the intercell handover;

means for allocating, for the call in the eligible cell, a traffic channel, at least in the uplink direction, set up at the same frequency and/or the same time slot as a traffic channel in the uplink direction that is allocated to the call in the current cell;

means for determining a third indication relative to the quality of the radio link between the mobile station and the base station of the current cell;

means for determining a fourth indication relative to the quality of the radio link between the mobile station and the base station of the eligible cell;

second comparison means for comparing the third and fourth indications in order to deduce therefrom, where necessary, an order of intercell handover for handing over the call from the base station of the current cell to the base station of the eligible cell.

10. The switching equipment as claimed in claim 9, in which said means for allocating are designed to allocate said traffic channel in the uplink direction only, at the same frequency and/or in the same time slot as said traffic channel in the uplink direction that is allocated to the call in the current cell.

11. The switching equipment as claimed in claim 9, in which said means for allocating are designed to allocate a specific traffic channel to the call in the current cell both in the uplink direction and in the downlink direction, at the same frequency and/or the same time slot as the corresponding channel allocated to the call in the eligible cell, the switching equipment additionally including means for handing over the call in the current cell to this specific traffic channel.

12. The switching equipment as claimed in claim 9, additionally including means for producing a command for controlling the transmit power of the mobile station by considering the signal received by the base station of the current cell and that received by the base station of the eligible cell.

13. A method of intercell handover of a call between a mobile station and a fixed network of an FDMA and/or TDMA cellular radiocommunication system, for handing over the call from the base station of a current cell to the base station of a neighboring cell, the method comprising the following steps:
a) determination, by the mobile station, of a first indication relative to the quality of the radio link between the mobile station and the base station of the current cell;
b) scan, by the mobile station, during periodic discrete time intervals, of the broadcast control channel of at least one neighboring cell and corresponding determination of a second indication relative to the quality of the radio link between the mobile station and the base station of said neighboring cell;
c) transmission to the fixed network, by the mobile station, of the first and second indications;
d) a first comparison, by the fixed network, of the first and second indications in order to deduce therefrom, where necessary, at least one neighboring cell that is eligible for the intercell handover;
e) allocation, by the fixed network, for the call in the eligible cell, of a traffic channel, at least in the up link direction, set up at the same frequency and/or the same time slot as a traffic channel in the uplink direction which is allocated to the call in the current cell;
f) determination, by the fixed network, of a third indication relative to the quality of the radio link between the mobile station and the base station of the current cell;
g) determination, by the fixed network, of a fourth indication relative to the quality of the radio link between the mobile station and the base station of the eligible cell;
h) a second comparison, by the fixed network, of the third and fourth indications in order to deduce therefrom, where necessary, an order of intercell handover.

* * * * *